US010240540B2

(12) United States Patent
Choi

(10) Patent No.: US 10,240,540 B2
(45) Date of Patent: Mar. 26, 2019

(54) ENGINE SYSTEM AND CONTROL METHOD USING THE SAME

(71) Applicant: HYUNDAI MOTOR COMPANY, Seoul (KR)

(72) Inventor: Choo Saeng Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 42 days.

(21) Appl. No.: 15/374,018

(22) Filed: Dec. 9, 2016

(65) Prior Publication Data
US 2018/0073453 A1   Mar. 15, 2018

(30) Foreign Application Priority Data
Sep. 13, 2016   (KR) .................. 10-2016-0118074

(51) Int. Cl.
| | | |
|---|---|---|
| *F02D 41/00* | (2006.01) | |
| *F02B 33/44* | (2006.01) | |
| *F02M 26/06* | (2016.01) | |
| *F02B 37/16* | (2006.01) | |
| *F02B 29/04* | (2006.01) | |
| *F02M 35/10* | (2006.01) | |

(Continued)

(52) U.S. Cl.
CPC ...... *F02D 41/0077* (2013.01); *F02B 29/0406* (2013.01); *F02B 33/446* (2013.01); *F02B 37/16* (2013.01); *F02D 41/0007* (2013.01); *F02D 41/062* (2013.01); *F02M 26/06* (2016.02); *F02M 35/10163* (2013.01); *F02D 41/0072* (2013.01); *F02D 41/042* (2013.01)

(58) Field of Classification Search
CPC ............. F02D 41/0077; F02D 41/0007; F02D 41/062; F02D 41/042; F02D 41/0072; F02B 29/0406; F02B 33/446; F02B 37/16; F02M 26/06; F02M 35/10163
USPC .................. 60/600, 605.1, 605.2, 605.3, 611
See application file for complete search history.

(56) References Cited

U.S. PATENT DOCUMENTS 9,091,223 B2 *   7/2015   Tsuyuki ................... F02D 21/08
2007/0119421 A1 *   5/2007   Lewis ................... F01N 11/002
                                                                    123/431

(Continued)

FOREIGN PATENT DOCUMENTS

JP   2014-020246 A   2/2014
JP   2014-034959 A   2/2014

*Primary Examiner* — Hoang M Nguyen
(74) *Attorney, Agent, or Firm* — Morgan Lewis & Bockius LLP

(57) ABSTRACT

An engine system includes: an intake line through which fresh air flows; an exhaust line through which exhaust gas flows; an exhaust gas recirculation (EGR) system which recirculates some of exhaust gas to a combustion chamber; a turbocharger having: a turbine that rotates by the exhaust gas; and a compressor rotating by the rotation of the turbine; an intercooler disposed in the intake line at a rear end of the compressor; an intake bypass line penetrating the intercooler from the intake line, adjusting the amount of intake gas to be supplied into the combustion chamber, and merging into the intake line at a front end of the compressor; a recirculation valve disposed in the intake bypass line; and a controller controlling opening and closing of the recirculation valve so that some of the intake gas is supplied into the intake line through the intake bypass line.

7 Claims, 10 Drawing Sheets

(51) Int. Cl.
*F02D 41/06* (2006.01)
*F02D 41/04* (2006.01)

(56) References Cited

U.S. PATENT DOCUMENTS

2010/0058740 A1* 3/2010 Kurtz .................... F01N 3/208
                                                    60/286
2013/0291536 A1* 11/2013 Koch ................ F02B 29/0468
                                                    60/599
2016/0177813 A1* 6/2016 Styles ............... F02B 29/0468
                                                    701/102

* cited by examiner

ENGINE SYSTEM AND CONTROL METHOD USING THE SAME

CROSS-REFERENCE TO RELATED APPLICATION

This application claims the benefit of priority to Korean Patent Application No. 10-2016-0118074 filed in the Korean Intellectual Property Office on Sep. 13, 2016, the entire content of which is incorporated herein by reference.

TECHNICAL FIELD

The present disclosure relates to an engine system and a control method using the same, and more particularly, to an engine system and a control method using the same, which are capable of reducing a concentration of exhaust gas remaining in an intake line in an engine equipped with an exhaust gas recirculation (EGR) system.

BACKGROUND

In general, nitrogen oxide (NOx) included in exhaust gas causes acid rain, irritates eyes and respiratory organs, and kills plants. The NOx is regulated as main air pollutants, and a number of researches are being conducted to reduce emission of the NOx.

An exhaust gas recirculation (EGR) system is a system mounted in a vehicle in order to reduce deleterious exhaust gas. In general, the amount of NOx increases in a case in which a proportion of air to the gaseous mixture is large and thus combustion is smoothly carried out. Therefore, the exhaust gas recirculation system is a system that mixes a part (e.g., 5 to 20%) of exhaust gas discharged from the engine with the gaseous mixture again so as to reduce the amount of oxygen in the gaseous mixture and hinder the combustion, thereby inhibiting generation of NOx.

As the exhaust gas recirculation system, there are a hot exhaust gas recirculation system (hot EGR system) which reduces particulate materials (PM) and hydrocarbon (HO) as well as NOx by delaying ignition timing and reducing an air-fuel ratio, and a cooled exhaust gas recirculation system (cooled EGR system) which hinders combustion by cooling recirculating exhaust gas and decreasing a temperature in a combustion chamber.

An EGR ratio refers to a ratio of the amount of recirculation gas introduced into the engine through the exhaust gas recirculation system to the overall amount of air (fresh air+recirculation gas) introduced into the engine. When the EGR ratio increases, a concentration of oxygen supplied into the combustion chamber is decreased, such that a combustion temperature is decreased, and the amount of nitrogen oxide is decreased. However, when the amount of recirculating exhaust gas is excessively increased, an output of the engine and fuel economy deteriorate. In contrast, when the EGR ratio decreases, the concentration of oxygen supplied into the combustion chamber is increased, such that a combustion temperature is increased, and the amount of nitrogen oxide is increased. Therefore, the amount of recirculating exhaust gas needs to be appropriately controlled.

In addition, after the engine is turned off, the recirculation gas remains in an intake flow path through which the recirculation gas and the fresh air flow. Further, when the engine is turned on again, the residual gas is introduced into the combustion chamber of the engine, and in this case, there occurs a problem of abnormal combustion such as knocking or pre-ignition.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine system and a control method using the same, which are capable of reducing a concentration of residual exhaust gas included in intake gas to be supplied into a combustion chamber after an engine is turned off.

The present disclosure has also been made in an effort to provide an engine system and a control method using the same which are capable of preventing the occurrence of abnormal combustion such as knocking or pre-ignition and accurately controlling an exhaust gas recirculation (EGR) ratio by reducing the concentration of residual exhaust gas included in intake gas.

According to an exemplary embodiment of the present disclosure, an engine system includes: an intake line through which fresh air to be supplied into a combustion chamber of an engine flows; an exhaust line through which exhaust gas discharged from the combustion chamber flows; an exhaust gas recirculation (EGR) system recirculating some of the exhaust gas discharged from the combustion chamber to the combustion chamber; a turbocharger including: a turbine disposed in the exhaust line and rotating by the exhaust gas discharged from the combustion chamber; and a compressor, which is disposed in the intake line, rotating in conjunction with the rotation of the turbine and compressing outside air; an intercooler disposed in the intake line at a rear end of the compressor; an intake bypass line penetrating the intercooler from the intake line at a front end of a throttle valve, adjusting the amount of intake gas to be supplied into the combustion chamber, and merging into the intake line at a front end of the compressor; a recirculation valve disposed in the intake bypass line; and a controller controlling opening and closing of the recirculation valve so that some of the intake gas compressed by the compressor is supplied into the intake line at the front end of the compressor through the intake bypass line.

The controller may control and open the recirculation valve during tip-out, such that some of the intake gas compressed by the compressor of the turbocharger is supplied into the intake line at the front end of the compressor.

The controller may calculate the amount of residual exhaust gas remaining in the intake line between the compressor and the combustion chamber after the engine is turned off. When the amount of residual exhaust gas is larger than a reference amount, the controller may control and open the recirculation valve when the engine is turned on again.

The controller may calculate the amount of residual exhaust gas based on an EGR ratio and a volume of the intake line.

The recirculation valve may be disposed at an upper end of the intercooler.

The recirculation valve may include: a housing having a flow path formed therein; a first passageway communicating with the flow path and communicating with the intake line at the front end of the compressor; a second passageway which communicating with the flow path and communicating with the intake line at the front end of the throttle valve; a third passageway communicating with the flow path and communicating with the intake line connected with the intercooler; and a actuator selectively closing the first passageway.

The actuator may include: a coil generating a magnetic force based on whether electric power is supplied; a flange selectively closing the first passageway by the magnetic force generated by the coil; and a spring providing elastic force in a direction in which the flange closes the first passageway.

The second passageway may be disposed at a lower end of the first passageway.

According to another exemplary embodiment of the present disclosure, a method of controlling an engine includes: calculating, by a controller, the amount of residual exhaust gas remaining in an intake line between a compressor of a turbocharger and an intake manifold after an engine is turned off; and controlling, by the controller, opening and closing of a recirculation valve that is installed in an intake bypass line which penetrates an intercooler from the intake line at a front end of a throttle valve and merges into the intake line at a front end of the compressor. The throttle valve adjusts the amount of intake gas to be supplied into a combustion chamber based on the amount of residual exhaust gas.

The controlling may include: determining, by the controller; whether the amount of residual exhaust gas is larger than a reference amount; and opening, by the controller; the recirculation valve when the engine is turned on again, in a case in which the amount of residual exhaust gas is larger than the reference amount.

The amount of residual exhaust gas may be calculated based on an EGR ratio and a volume of the intake line.

According to the engine system and the control method according to the exemplary embodiments of the present disclosure, it is possible to reduce the concentration of residual exhaust gas included in the intake gas to be supplied into the combustion chamber by increasing the amount of fresh air to be supplied into the intake manifold through the intake bypass line and the recirculation valve.

In addition, it is possible to prevent the occurrence of abnormal combustion in the combustion chamber and to accurately control the EGR ratio by reducing the concentration of residual exhaust gas.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION OF THE EMBODIMENTS

Figure 1A:
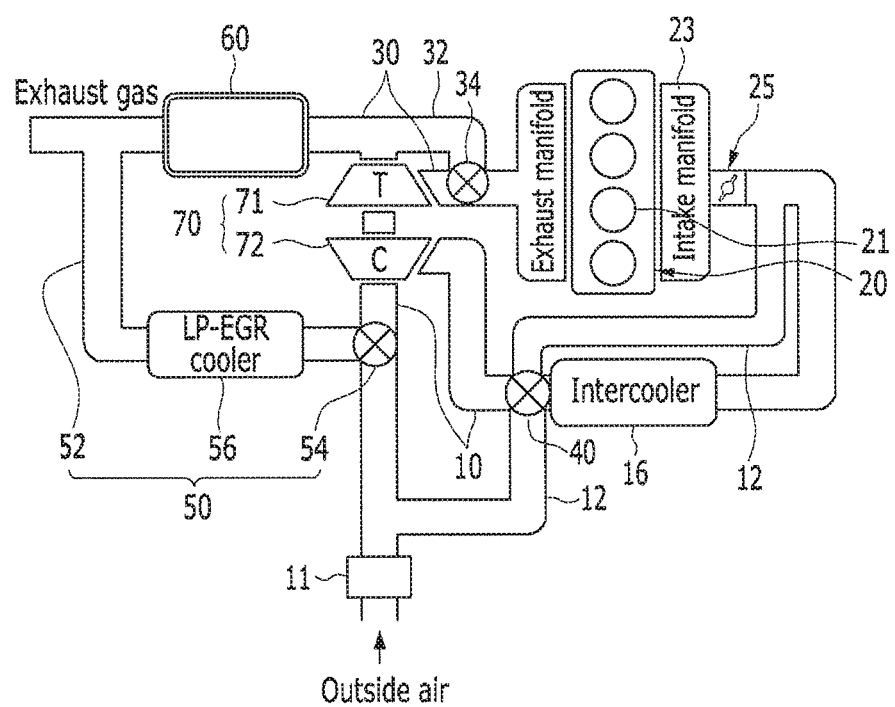
FIGS. 1A and 1B are conceptual views illustrating a configuration of an engine system according to an exemplary embodiment of the present disclosure.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

In addition, the size and thickness of each component illustrated in the drawings are arbitrarily shown for understanding and ease of description, but the present disclosure is not limited thereto. Thicknesses of several portions and regions are enlarged for clear expressions.

Hereinafter, an engine system according to an exemplary embodiment of the present disclosure will be described in detail with reference to the accompanying drawings.

Figure 1B:
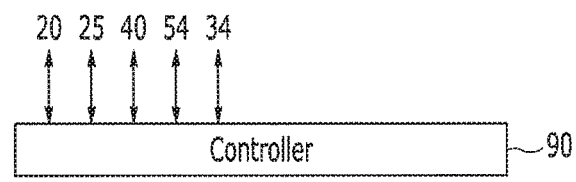

FIGS. 1A and 1B are conceptual views illustrating a configuration of an engine system according to an exemplary embodiment of the present disclosure.

As illustrated in FIGS. 1A and 1B, the engine system according to an exemplary embodiment of the present disclosure includes an engine 20, a turbocharger 70, an exhaust gas recirculation (EGR) system 50, an intercooler 16, a recirculation valve 40, and a controller 90.

The engine 20 includes a plurality of combustion chambers 21 that generate driving power by combusting fuel. The engine 20 further includes an intake line 10 through which intake gas to be supplied to the combustion chamber 21 flows, and an exhaust line 30 through which exhaust gas discharged from the combustion chamber 21 flows.

An air cleaner 11, which filters fresh air introduced from the outside, is disposed in the intake line 10.

An intake manifold, which distributes the intake gas to be supplied into the plurality of combustion chambers 21, is disposed at a front end of the combustion chambers 21, and a throttle valve 25, which adjusts the amount of intake gas to be introduced into the intake manifold, is disposed at a front end of the intake manifold.

An exhaust gas purification apparatus 60, which removes various types of hazardous substances included in the exhaust gas discharged from the combustion chamber 21, is disposed in the exhaust line 30. To remove nitrogen oxide, the exhaust gas purification apparatus 60 may include a lean NOx trap (LNT), a diesel oxidation catalyst, and a diesel particulate filter.

The turbocharger 70 compresses the intake gas (outside air+recirculation gas) which is introduced through the intake line 10, and supplies the intake gas into the combustion chamber 21. The turbocharger 70 includes a turbine 71 disposed in the exhaust line 30 and rotating by exhaust gas discharged from the combustion chamber 21, and a compressor 72 rotating in conjunction with the rotation of the turbine 71 and compressing the intake gas.

The EGR system 50 is an apparatus which recirculates a part of the exhaust gas discharged from the combustion chamber 21 to the combustion chamber 21. The EGR system 50 (low pressure exhaust gas recirculation (LP-EGR) apparatus) includes an EGR line 52, an EGR cooler 56, and an EGR valve 54. While the low pressure EGR apparatus is described as an example in the exemplary embodiment of the present disclosure, other types of EGR apparatuses (e.g., a high pressure EGR apparatus) may be applied.

The EGR line 52 branches off from the exhaust line 30 at a rear end of the turbine 71, and merges into the intake line 10 at a front end of the compressor 72. The EGR cooler 56 is disposed in the EGR line 52, and cools the exhaust gas that flows through the EGR line 52. The EGR valve 54 is disposed at a point at which the EGR line 52 and the intake line 10 merge together, and adjusts the amount of exhaust gas that flows into the intake line 10 through the EGR line 52. Here, the exhaust gas, which is supplied into the intake line 10 through the EGR line 52, is referred to as recirculation gas.

The intercooler 16 cools the intake gas, which is introduced through the intake line 10, through a heat exchange with a coolant. That is, because the intake gas compressed by the turbocharger 70 expands as a temperature thereof increases, oxygen density of the intake gas supplied into the combustion chamber 21 decreases, and for this reason, it is difficult to output torque required for the engine 20. Therefore, the density of the intake gas is increased by cooling the intake gas by the intercooler 16, thereby improving combustion efficiency of the engine 20.

An intake bypass line 12 penetrates an inlet or an outlet of the intercooler 16 from a front end of the throttle valve 25 and merges into the intake line 10 at a front end of the compressor 72. The intercooler 16 is disposed at a point at which the intake bypass line 12 and the intake line 10 intersect.

Further, the recirculation valve 40 may be installed integrally with the inlet or the outlet of the intercooler 16, and particularly, the recirculation valve 40 may be disposed at an upper end of the intercooler 16. The recirculation valve 40 is opened and closed by control signals from the controller 90.

The controller 90 may be configured by one or more processors which are operated by a preset program, and the preset program is configured to perform respective steps of a method of controlling an engine according to another exemplary embodiment of the present disclosure. In an exemplary embodiment of the present disclosure, the controller 90 may be an electronic control unit (ECU).

Figure 2:
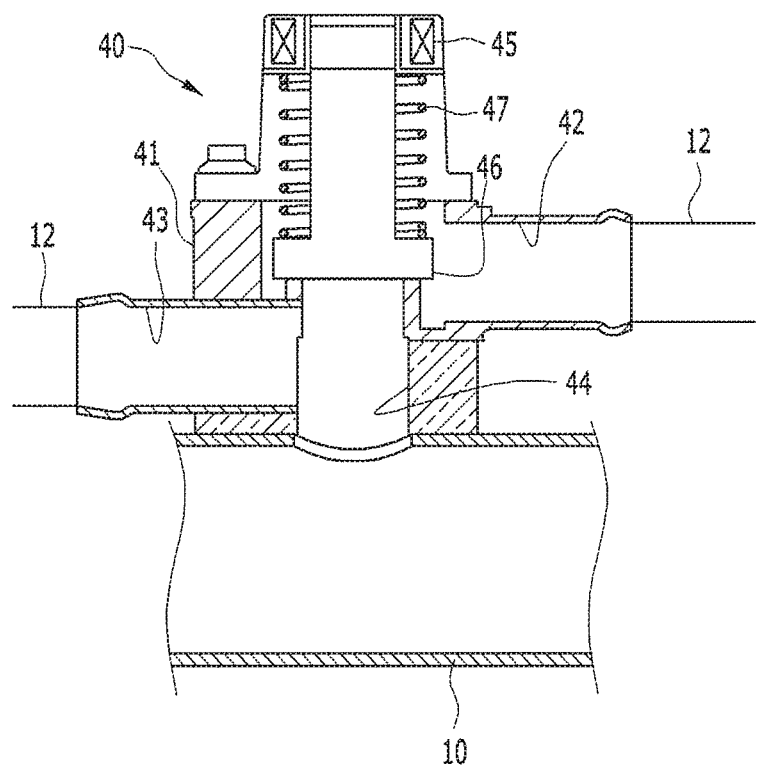
FIG. 2 is a conceptual view illustrating a configuration of a recirculation valve according to the exemplary embodiment of the present disclosure.

Referring to FIG. 2, the recirculation valve 40 includes a housing 41, a first passageway 42, a second passageway 43, a third passageway 44, and a actuator.

The housing 41 is installed on the intake line 10 provided at an upper side of the intercooler 16, and a flow path is formed in the housing 41.

The first passageway 42 is formed in the housing 41, communicates with the flow path, and communicates with the intake line 10 at the front end of the throttle valve 25 through the intake bypass line 12. The second passageway 43 is formed in the housing 41, communicates with the flow path, and communicates with the intake line at the front end of the throttle valve 25. The third passageway 44 is formed in the housing 41, communicates with the flow path, and communicates with the intake line 10 connected with the intercooler 16.

The actuator is a power source which is installed in the housing 41 and operates a blocking portion. The actuator may be configured by a solenoid valve that includes a coil 45 which generates magnetic force based on whether electric power is supplied, a flange 46 which selectively closes the first passageway 42 by magnetic force generated by the coil 45, and a spring 47 which provides elastic force in a direction in which the flange 46 closes the first passageway 42.

That is, when no electric power is applied to the coil 45 of the actuator, the flange 46 closes the first passageway 42 by being moved downward by elastic force of the spring 47. On the other hand, when the electric power is applied to the coil 45 of the actuator, the flange 46 opens the first passageway 42 by being moved upward.

For example, in a case in which residual exhaust gas remains in the intake line 10 between the rear end of the compressor 72 and the front end of the throttle valve 25, the controller 90 supplies the electric power to the coil 45 so as to open the first passageway 42, thereby additionally supplying the intake gas into the combustion chamber 21 through the recirculation valve 40.

When the engine is turned off during a process in which the recirculation gas is supplied into the combustion chamber 21 through the EGR system 50, the exhaust gas remains in the intake line 10 between the compressor 72 and the combustion chamber 21. In this case, because a proportion of carbon dioxide in the residual exhaust gas is high, the residual exhaust gas remains at a lower side of the intercooler 16 in many instances.

Further, when the engine 20 is turned on again, the residual exhaust gas remaining in the intake line 10 is supplied into the combustion chamber 21, and as a result, abnormal combustion such as knocking or pre-ignition occurs due to the residual exhaust gas.

To prevent the aforementioned abnormal combustion, the controller 90 calculates the amount of residual exhaust gas after the engine 20 is turned off, and if the amount of residual exhaust gas is larger than a reference amount, the controller 90 opens the recirculation valve 40 when the engine 20 is turned on again. Here, the controller 90 may calculate the amount of residual exhaust gas based on the EGR ratio and a volume of the intake line.

Figure 3A:
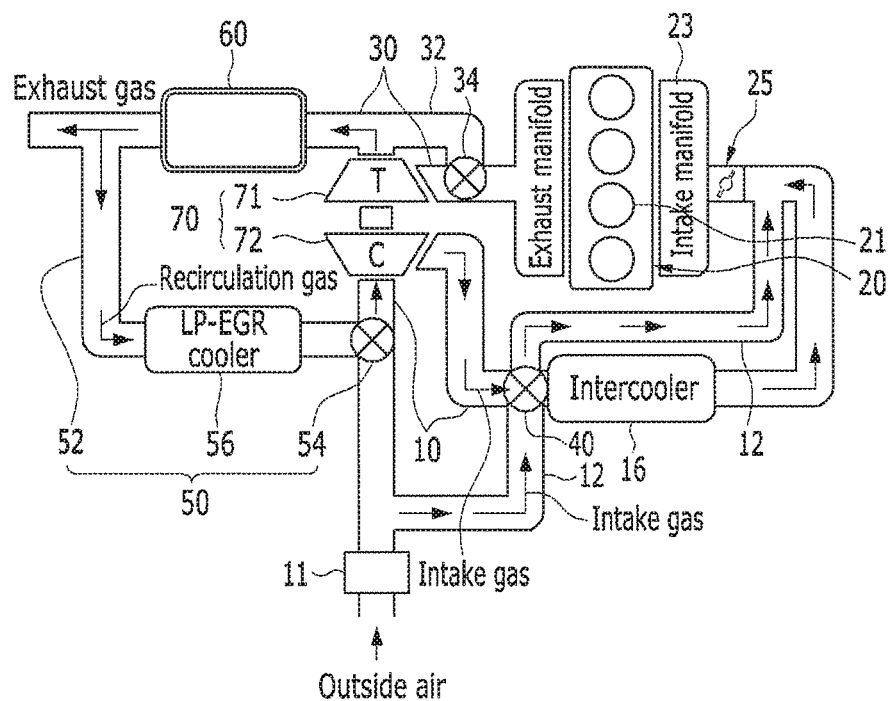
FIGS. 3A, 3B and 4 are conceptual views illustrating a flow of intake gas which passes through the recirculation valve in the engine system according to the exemplary embodiment of the present disclosure.
Figure 3B:
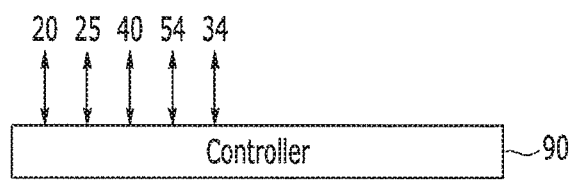
Figure 4:
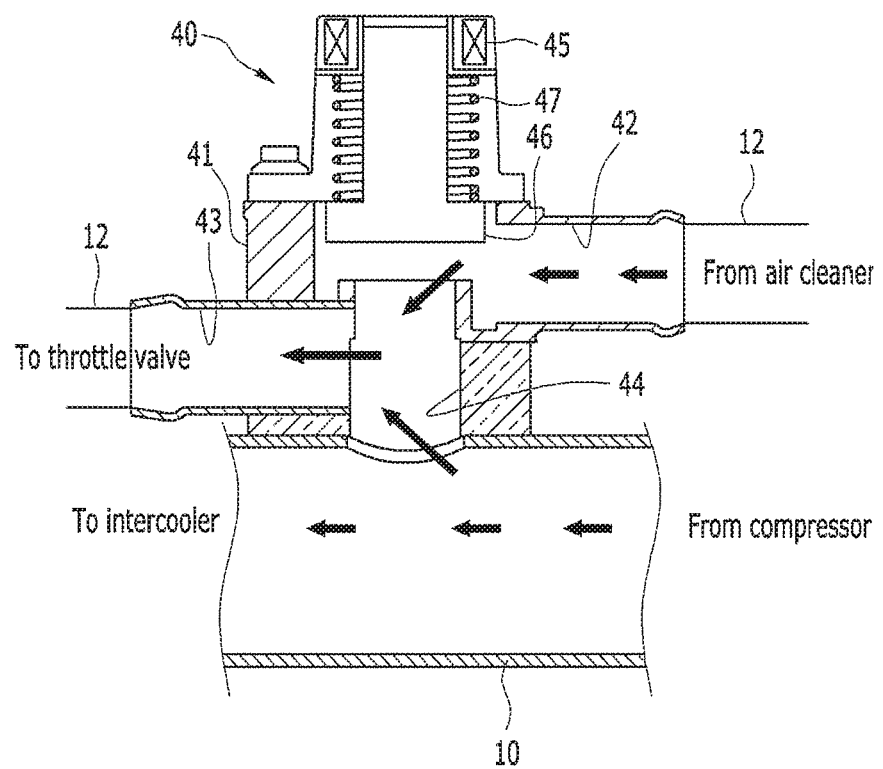

As illustrated in FIGS. 3A, 3B and 4, if the recirculation valve 40 is opened when the engine 20 is turned on again, the intake gas to be supplied into the combustion chamber 21 may be additionally supplied into the combustion chamber 21 through a first intake path (the air cleaner 11→ the compressor 72→ the intercooler 16→ the throttle valve 25) formed by the intake line 10 and a second intake path (the air cleaner 11→ the recirculation valve 40→ the throttle valve 25) formed by the intake line 10 and the intake bypass line 12. Therefore, the amount of intake gas to be supplied into the combustion chamber 21 is increased, and as a result, it is possible to reduce the concentration of the residual exhaust gas included in the intake gas to be supplied into the combustion chamber 21 and to prevent the occurrence of abnormal combustion.

The intake gas to be supplied into the combustion chamber 21 is generally supplied through the first intake path, and if the amount of residual exhaust gas is larger than a reference amount, the recirculation valve 40 is opened, and the amount of intake gas to be supplied into the combustion chamber 21 through the second intake path is increased. As a result, the concentration of the residual exhaust gas included in the intake gas may be decreased. Since a path of the intake gas to be introduced into the combustion chamber through the intake bypass line 12 is shorter than the existing path of the intake gas through the intake line 10, the concentration of the residual exhaust gas to be introduced into the combustion chamber may be quickly reduced.

In particular, since the recirculation valve 40 is disposed at the upper end of the intercooler 16, it is possible to retard that a large amount of residual exhaust gas remaining at the lower side of the intercooler 16 is supplied into the combustion chamber 21 through the intake bypass line 12 when the engine is turned off and then turned on again.

The recirculation valve 40 may selectively discharge high pressure, which is formed between the rear end of the compressor 72 and the front end of the throttle valve 25, to the intake line 10 at the front end of the compressor 72.

For example, when a user or driver performs a tip-out operation while the vehicle accelerates, the controller 90 closes the throttle valve 25 so as to block the supply of the intake gas into the combustion chamber 21 in order to reduce output of the engine 20. In this case, a boost pressure is formed in the intake line 10 between the rear end of the compressor 72 and the throttle valve 25 by the turbocharger 70.

Figure 5A:
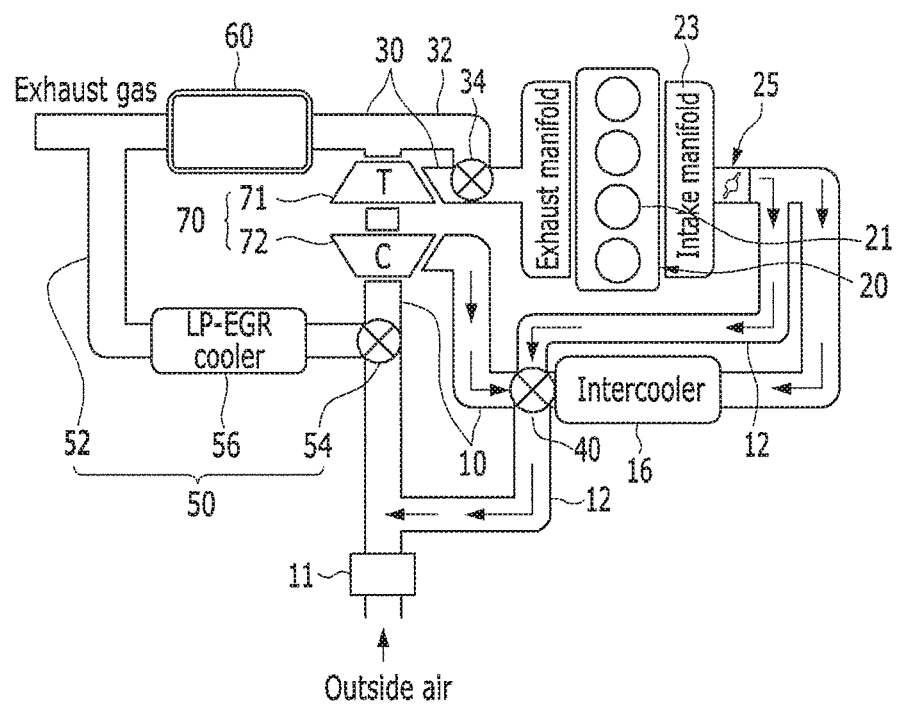
FIGS. 5A, 5B and 6 are conceptual views illustrating a flow of compressed air which passes through the recirculation valve in the engine system according to the exemplary embodiment of the present disclosure.
Figure 5B:
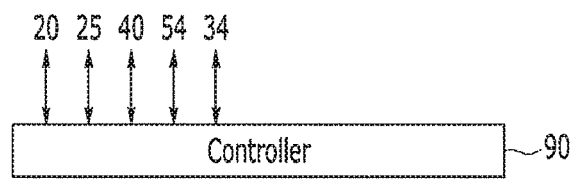
Figure 6:
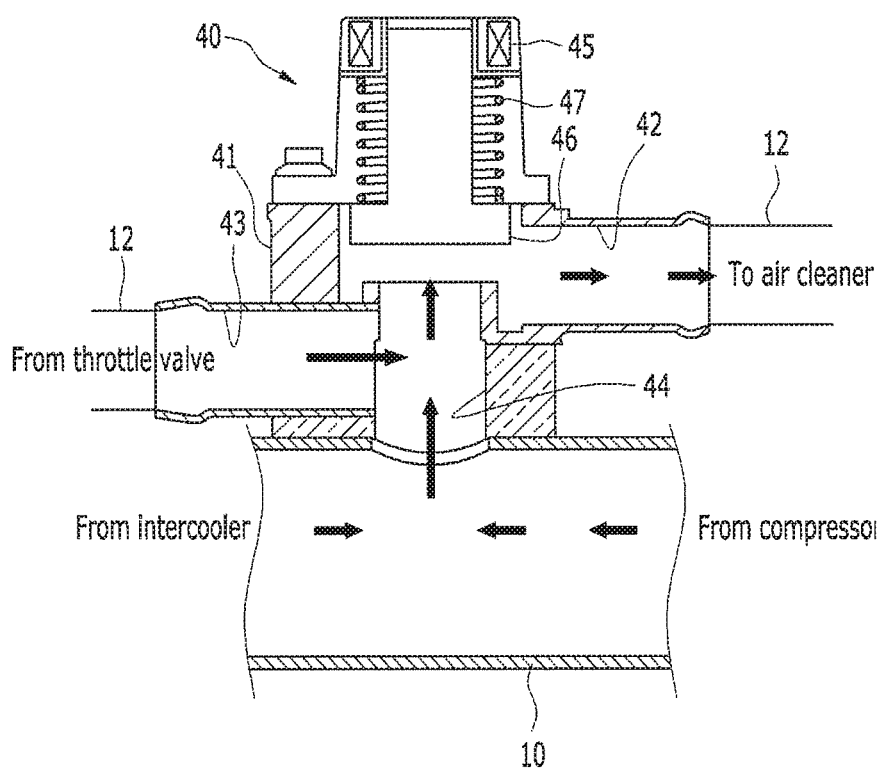

Therefore, as illustrated in FIGS. 5A, 5B and 6, the controller 90 controls and opens the recirculation valve 40 so as to discharge the boost pressure, which is formed in the intake line 10 between the rear end of the compressor 72 and the throttle valve 25, to the intake line 10 at the front end of the compressor 72 through the intake bypass line 12.

If the boost pressure remains in the intake line 10 between the rear end of the compressor 72 and the throttle valve 25, surging impact may occur when the throttle valve 25 is opened again. Therefore, the controller 90 opens the recirculation valve 40 and discharges the boost pressure in the intake line 10 through the intake bypass line 12.

When the engine is normally operated, the controller 90 moves the flange 46 downward by applying the electric power to the coil 45 of the recirculation valve 40, and as a result, the first passageway is closed, and the intake gas is not introduced into the combustion chamber 21 through the intake bypass line 12.

Hereinafter, a method of controlling the engine system according to the exemplary embodiment of the present disclosure will be described in detail with reference to the accompanying drawings.

Figure 7:
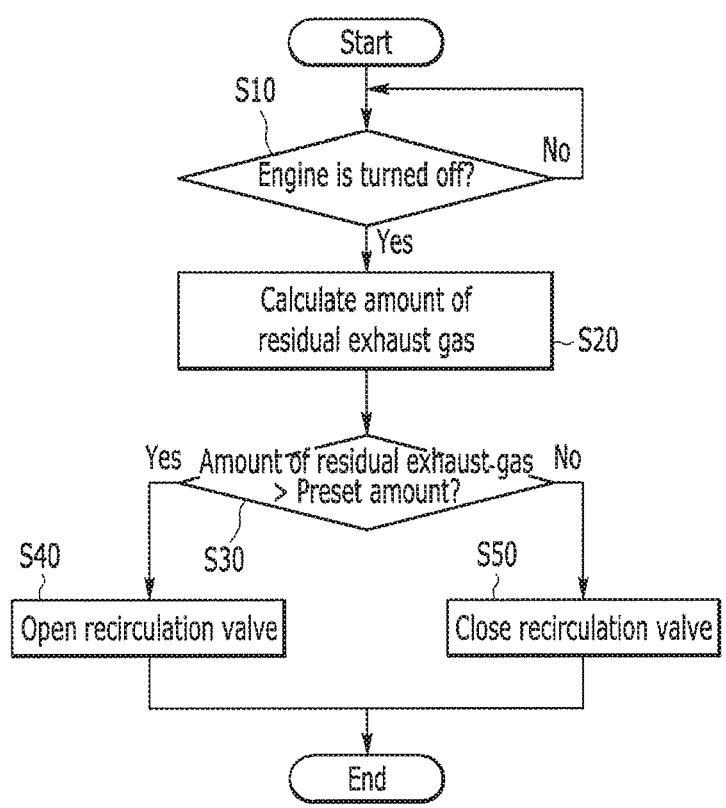
FIG. 7 is a flowchart illustrating a method of controlling an engine according to another exemplary embodiment of the present disclosure.

FIG. 7 is a flowchart illustrating a method of controlling an engine according to another exemplary embodiment of the present disclosure.

As illustrated in FIG. 7, the controller 90 determines whether the engine 20 is turned off (S10).

When the engine 20 is turned off, the controller 90 calculates the amount of residual exhaust gas remaining in the intake line 10 between the compressor 72 and the intake manifold 23 (S20). In this case, the controller 90 may calculate the amount of residual exhaust gas based on the EGR ratio (exhaust gas recirculation ratio) and a volume of the intake line 10.

The EGR ratio means the amount of recirculation gas that is supplied into the combustion chamber 21 through the EGR system 50 before the engine 20 is turned off, and the volume of the intake line 10 is determined in advance by design, and as a result, the amount of residual exhaust gas may be calculated based on the EGR ratio and the volume of the intake line 10.

When the engine 20 is turned on again, the controller 90 compares the amount of residual exhaust gas with a reference amount (S30), and if the amount of residual exhaust gas is larger than the reference amount, the controller 90 opens the recirculation valve 40 (S40), and allows the intake gas to be supplied into the combustion chamber 21 through the first intake path and the second intake path.

If the amount of residual exhaust gas is equal to or smaller than the reference amount in step 330, the controller 90 closes the recirculation valve 40 (S50), and allows the intake gas to be supplied into the combustion chamber 21 through only the first intake path.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An engine system comprising:
   an intake line through which fresh air, which is to be supplied into a combustion chamber of an engine, flows;
   an exhaust line through which exhaust gas discharged from the combustion chamber flows;
   an exhaust gas recirculation (EGR) system which recirculates some of the exhaust gas which is discharged from the combustion chamber back to the combustion chamber;
   a turbocharger including: a turbine disposed in the exhaust line and rotating by the exhaust gas discharged from the combustion chamber; and a compressor, which is disposed in the intake line, rotating in conjunction with the rotation of the turbine and compressing outside air;
   an intercooler disposed in the intake line at a rear end of the compressor;
   an intake bypass line penetrating the intercooler from the intake line at a front end of a throttle valve, which adjusts the amount of intake gas to be supplied into the combustion chamber, the intake bypass line merging into the intake line at a front end of the compressor;
   a recirculation valve disposed in the intake bypass line; and
   a controller controlling opening and closing of the recirculation valve so that some of the intake gas compressed by the compressor is supplied into the intake line at the front end of the compressor through the intake bypass line or the intake gas is supplied into the combustion chamber through the intake bypass line,
   wherein the recirculation valve includes:
   a housing having a flow path formed therein;
   a first passageway communicating with the flow path and communicating with the intake line at the front end of the compressor;
   a second passageway communicating with the flow path and communicating with the intake line at the front end of the throttle valve;
   a third passageway communicating with the flow path and communicating with the intake line connected with the intercooler; and
   a actuator selectively closing the first passageway.

2. The engine system of claim 1, wherein the controller controls and opens the recirculation valve during tip-out such that some of the intake gas compressed by the compressor of the turbocharger is supplied into the intake line at the front end of the compressor.

3. The engine system of claim 1, wherein the controller calculates the amount of residual exhaust gas remaining in the intake line between the compressor and the combustion chamber after when the engine is turned off, and
   wherein when the amount of residual exhaust gas is larger than a reference amount, the controller controls and opens the recirculation valve when the engine is turned on again.

4. The engine system of claim 3, wherein the controller calculates the amount of residual exhaust gas based on an EGR ratio and a volume of the intake line.

5. The engine system of claim 1, wherein the actuator includes:
- a coil generating a magnetic force based on whether electric power is supplied to the actuator;
- a flange selectively closing the first passageway by the magnetic force generated by the coil; and
- a spring providing elastic force in a direction in which the flange closes the first passageway.

6. The engine system of claim 1, wherein the second passageway is disposed at a lower end of the first passageway.

7. The engine system of claim 1, wherein the recirculation valve is disposed at an upper end of the intercooler.

\* \* \* \* \*